United States Patent
Sasaoka et al.

(10) Patent No.: US 6,868,213 B2
(45) Date of Patent: Mar. 15, 2005

(54) OPTICAL FIBER AND PRODUCTION METHOD THEREFOR

(75) Inventors: Eisuke Sasaoka, Yokohama (JP); Takemi Hasegawa, Yokohama (JP); Masashi Onishi, Yokohama (JP); Shinji Ishikawa, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 49 days.

(21) Appl. No.: 10/121,724

(22) Filed: Apr. 15, 2002

(65) Prior Publication Data

US 2002/0159734 A1 Oct. 31, 2002

(30) Foreign Application Priority Data

Apr. 25, 2001 (JP) ........................................ 2001-128151

(51) Int. Cl.[7] ................................................. G02B 6/02
(52) U.S. Cl. ........................................ 385/125; 123/126
(58) Field of Search ............................. 385/39, 50, 60, 385/70, 80, 98, 123–128

(56) References Cited

U.S. PATENT DOCUMENTS

| 4,919,513 A | * | 4/1990 | Nakakuki et al. ........... 385/126 |
| 4,919,531 A | * | 4/1990 | Mashiko et al. ......... 385/126 X |
| 5,692,088 A | * | 11/1997 | Ishiharada et al. .......... 385/125 |
| 6,404,966 B1 | * | 6/2002 | Kawanishi et al. ......... 385/125 |
| 6,661,954 B2 | * | 12/2003 | Sasaoka et al. ............... 385/39 |
| 2001/0038740 A1 | | 11/2001 | Hasegawa et al. |
| 2002/0106164 A1 | * | 8/2002 | Sasaoka et al. ............... 385/70 |

FOREIGN PATENT DOCUMENTS

| DE | 25 42 587 | 4/1977 |
| EP | 0 344 478 A2 | 12/1989 |
| JP | 3072842 | 6/2000 |
| WO | WO 00/49435 | 8/2000 |
| WO | WO 00/60388 | 10/2000 |

* cited by examiner

*Primary Examiner*—Phan T. H. Palmer
(74) *Attorney, Agent, or Firm*—McDermott Will & Emery LLP

(57) ABSTRACT

The present invention provides an optical fiber which has a hollow portion extending along the axis and which reduces degradation of the optical characteristics, and a production method thereof. An optical fiber includes a hollow core portion, and a cladding portion which surrounds the hollow core portion. The refractive index of the hollow core portion is lower than that of the cladding portion. The hollow core portion is closed at both ends of the optical fiber so as to form sealed portions. The sealed portions are formed by, for example, heating the optical fiber and softening the cladding portion. This prevents foreign material and the like from entering the hollow core portion. Ferrules of optical connectors are attached to both end faces of the optical fiber.

14 Claims, 5 Drawing Sheets

OPTICAL FIBER AND PRODUCTION METHOD THEREFOR

BACKGROUND OF THE INVENTION

1. Field of the Invention

The present invention relates to an optical fiber having a hollow portion which extends along its axis, and to a production method therefor.

2. Description of the Background Art

Japanese Patent No. 3072842 discloses a single-mode optical fiber which includes a hollow core, and a cladding formed around the core, having a photonic band gap structure, and which propagates light by Bragg reflection. In this prior art, however, no consideration was given to the protection of the hollow portion in the optical fiber, which may result in the deterioration of the optical characteristics, for example, the optical loss may increase.

SUMMARY OF THE INVENTION

It is an object of the present invention to provide an optical fiber which has a hollow portion extending along its axis and which reduces degradation of optical characteristics, and a production method therefor.

In order to achieve this object, there is provided an optical fiber comprising a core portion and a cladding portion which surrounds the core portion, wherein at least one of the core and the cladding portions has a hollow portion extending along its axis, and wherein a sealed portion is formed at an end face of the optical fiber so as to close the hollow portion.

In one embodiment, the sealed portion may be formed by heating the optical fiber to close the hollow portion, or may be formed by placing a liquid-state material into the hollow portion and then solidifying the material. Alternatively, the sealed portion may be formed by providing the end face of the optical fiber with a lid which covers the hollow portion. In this case, the lid may be made of a resin or metal film.

According to an optional aspect of the present invention, a connector may be attached to the end face of the optical fiber. The sealed portion may be formed at both end faces of the optical fiber.

The present invention is further explained below by referring to the accompanying drawings. The drawings are provided solely for the purpose of illustration and are not intended to limit the scope of the invention.

DESCRIPTION OF THE PREFERRED EMBODIMENTS

Figure 1:
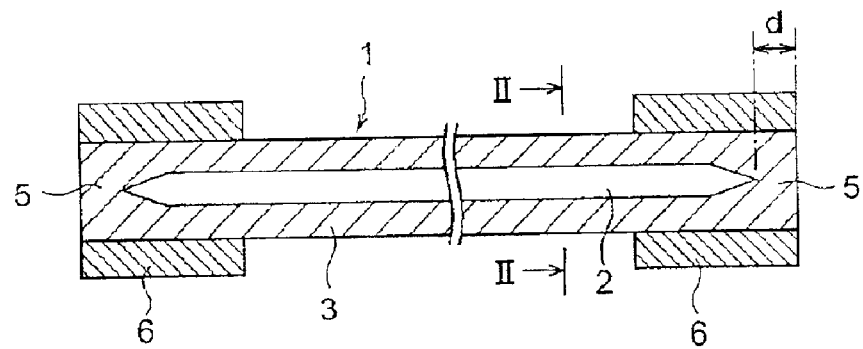
FIG. 1 is a longitudinal sectional view of an optical fiber having a sealed end structure according to a first embodiment of the present invention.

Embodiments of the present invention are explained below by referring to the accompanying drawings. In the drawings, the same number bears the same sign to avoid duplicate explanation. The ratios of the dimensions in the drawings do not necessarily coincide with the explanation.

Inventors have found through experiments that the optical loss of an optical fiber having a hollow portion increases by the entry of, for example, foreign materials and moisture into the hollow portion. The present invention has been made on the basis of such findings.

First, a first embodiment of the present invention will be described with reference to FIGS. 1, 2, and 3A to 3E. FIG. 1 is a longitudinal sectional view of an optical fiber of the embodiment.

Figure 2:
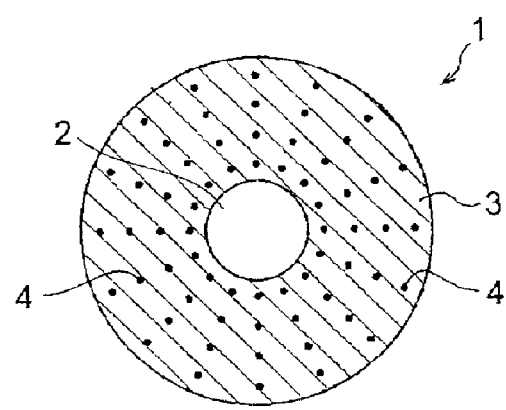
FIG. 2 is a view of cross section taken along line II—II in FIG. 1.

Referring to FIG. 1, an optical fiber 1 of the embodiment is composed of a core portion having a hollow structure (hereinafter referred to as a "hollow core portion 2"), and a cladding portion 3 which is made of silica glass and which surrounds the hollow core portion 2. The refractive index of the hollow core portion 2 is lower than that of the cladding portion 3. As shown in FIG. 2, the cladding portion 3 includes a plurality of refractive index changing portions 4 which are radially arranged in the cross section thereof and which extend along the axis of the optical fiber 1. The refractive-index changing portions 4 serve to periodically modulate the refractive index. The refractive-index changing portions 4 may be formed of holes, or rods which added with a dopant having a predetermined refractive index and which are embedded in the cladding portion 3.

In such an optical fiber 1, out of light incident on the optical fiber, the light having specific wavelength is selectively confined by Bragg reflection at the refractive-index changing portions 4 having periodical modulation of the refractive index, and propagates through the hollow core portion 2. By using the optical fiber 1 having such a hollow core portion 2, influence of nonlinear optical effects can be reduced, and a waveguide dispersion quite different from that of a conventional optical fiber, having no hollow in the core portion, can be obtained.

The hollow core portion 2 is closed at both ends of the optical fiber 1 so as to form a sealed portions 5. In this case, the size "d" of the sealed portions 5 is made sufficiently small so as to reduce spreading of light and to minimize a harmful effect on light transmission even when the Bragg reflection condition is not satisfied at the sealed portions 5. Ferrules 6 of optical connectors are attached to both ends of the optical fiber 1. By thus attaching the connectors to the optical fiber 1, the optical fiber 1 can easily be connected to the same type of optical fiber or to a conventional optical fiber, having no hollow in core or cladding.

Figure 3A:
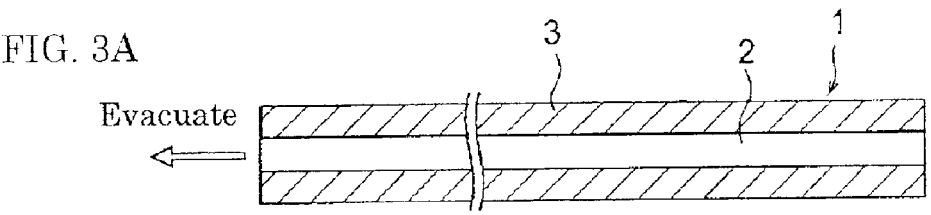
FIGS. 3A to 3E are explanatory views showing the process of producing the optical fiber shown in FIG. 1.

A process of producing such an optical fiber 1 with connectors will now be described with reference to FIGS. 3A to 3E. First, an optical fiber 1 having a hollow core portion 2 is prepared, and air inside the hollow core portion 2 is evacuated through one end portion of the optical fiber 1 by a vacuum pump or the like (FIG. 3A).

Figure 3B:
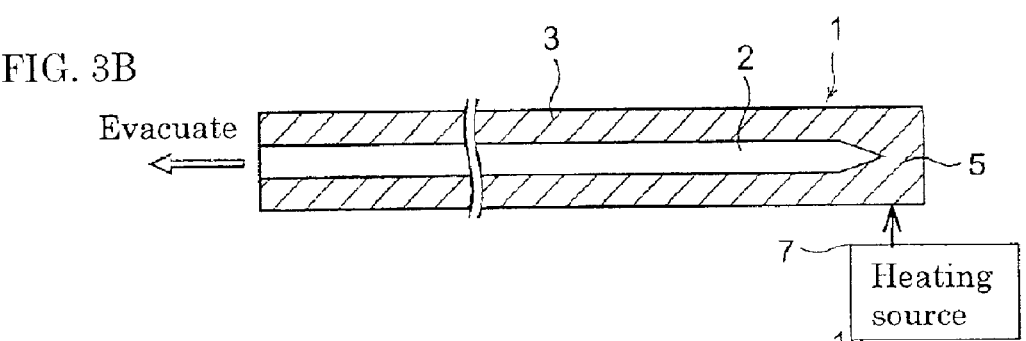
Figure 3C:
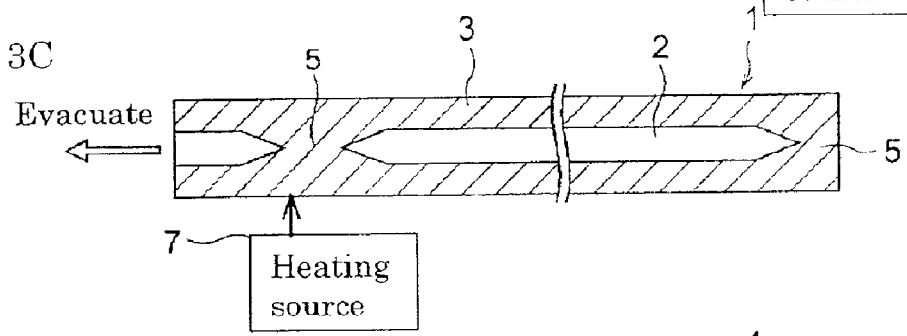

In such a state in which pressure in the hollow core portion 2 is reduced, the other end portion of the optical fiber 1 is heated by a heating source 7 so as to soften the cladding portion 3 at the other end portion, and close the hollow core portion 2 from the outside there. A sealed portion 5 is thereby formed at one end portion of the optical fiber 1 (FIG. 3B). In this case, the external shape of the cladding portion 3 is rarely damaged. Subsequently, a portion of the optical fiber 1 at a distance of a predetermined fiber length from the end face of the sealed portion 5 is heated by the heating source 7, and then the hollow core portion there is closed. Thus, a sealed portion 5 is also formed at the other end of the optical fiber 1 (FIG. 3C). Since the sealed portions 5 are thus formed by softening the cladding portion 3 with heat, the hollow core portion 2 is tightly closed by the same glass as that of the cladding portion 3.

The cladding portion 3 is heated in the state in which the pressure in the hollow core portion 2 has been reduced in order to smoothly close the hollow core portion 2 in this embodiment. However, to form such a sealed portion, a method is not limited to this. For example, the cladding portion may be heated while pressing the optical fiber 1 from the outside by any means to close the hollow core portion 2, or it may be closed only by heating the optical fiber 1. Alternatively, the hollow core portion 2 may be closed by heating the end of the optical fiber 1 with a fusion splicer, or by connecting the optical fiber 1 to conventional optical fibers having no hollow in core or cladding by the fusion splicer.

Figure 3D:
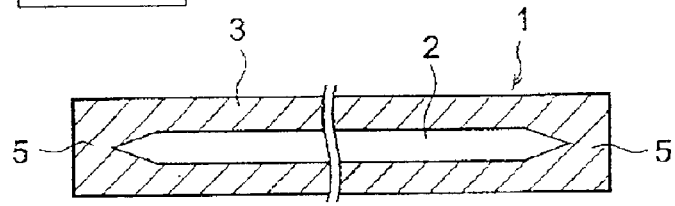

Next, the sealed portion 5 formed on the pressure-reduced side of the hollow core portion 2 is cut. Consequently, the optical fiber 1 is obtained with the hollow core portion 2 closed at both ends (FIG. 3D).

Figure 3E:
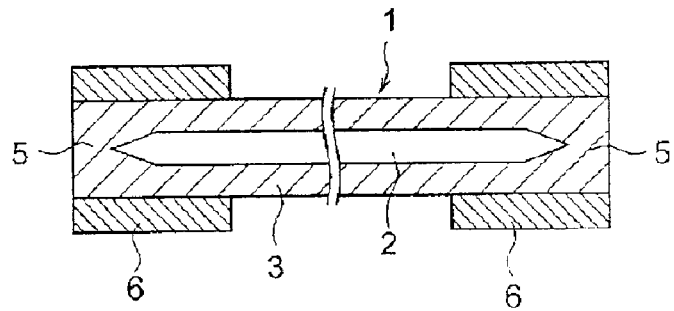

Subsequently, both ends of the optical fiber 1 are inserted into holes of ferrules 6, and fixed with the ferrules 6 by adhesives. After that, the end faces of the optical fiber 1 protruding from the end faces of the ferrules 6 are polished (FIG. 3E). In this case, the hollow core portion 2 has been closed by the same material as that of the cladding portion 3 and the material at the end faces of the optical fiber 1 is uniform. Therefore, the end faces of the optical fiber 1 can easily be polished. The amount of polishing the end faces of the optical fiber 1 is set within a range that sealing the hollow core portion 2 at both end faces of the optical fiber 1 can be maintained. Since the hollow core portion 2 is closed at both end faces of the optical fiber 1 in this embodiment, foreign materials and moisture (OH radical) are prevented from entering the hollow core portion 2. This can suppress increase of optical loss and reduce degradation of the optical characteristics. Moreover, the optical fiber 1 can be prevented from being broken at the hollow core portion 2 when the end faces of the optical fiber 1 are polished in order to attach the optical connectors thereto.

In this embodiment, the sealed portions are formed by heating the ends of the optical fiber and softening the cladding portion thereof. The sealed portions are made of the same glass as that of the cladding portion, so they are consolidated. Further, since the material at the end faces of the optical fiber is uniform, the end faces of the optical fiber can be easily subjected to machining such as polishing.

A second embodiment of the present invention will be described with reference to FIGS. 4 and 5A to 5C. In these figures, members which are the same as or equivalent to those in the first embodiment are denoted by the same reference numerals, and descriptions thereof are omitted.

Figure 4:
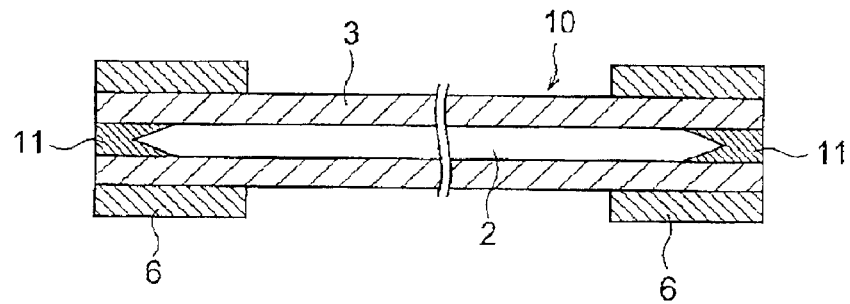
FIG. 4 is a longitudinal sectional view of an optical fiber having a sealed end structure according to a second embodiment of the present invention.

Referring to FIG. 4, sealed portions 11 are formed at both ends of an optical fiber 10 of this embodiment by closing a hollow core portion 2 with an ultraviolet (UV)-curable resin. The UV-curable resin 11 is liquid in a normal state, and is cured with ultraviolet rays. The refractive index of the UV-curable resin 11 is higher than that of the material of a cladding portion 3. Since spreading light power is thereby reduced, there is little harmful effect on light transmission even when the Bragg reflection condition is not satisfied with the sealed portions 11.

Figure 5A:
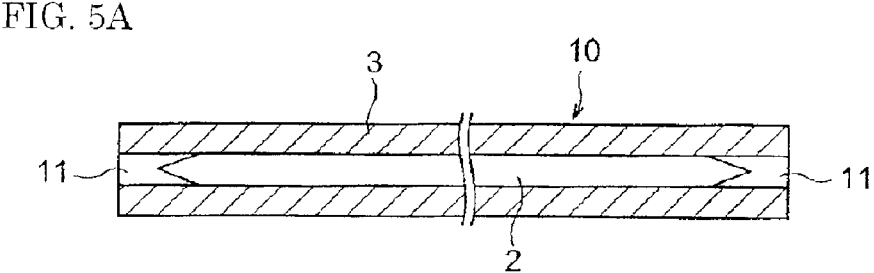
FIGS. 5A to 5C are explanatory views showing the process of producing the optical fiber shown in FIG. 4.
Figure 5B:
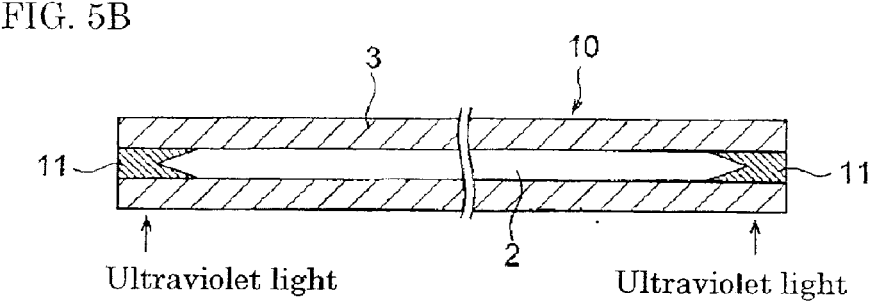
Figure 5C:
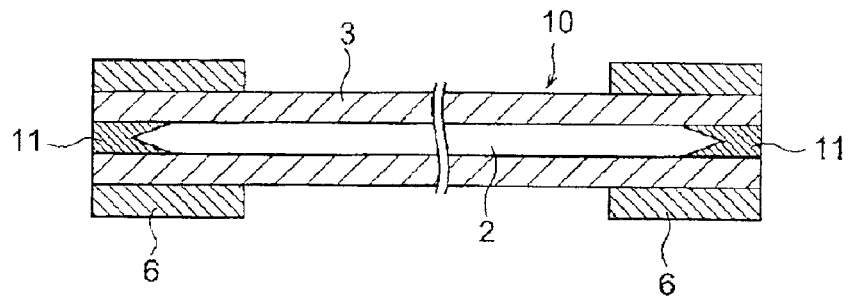

A process of producing such an optical fiber 10 will now be described with reference to FIGS. 5A to 5C. First, an optical fiber 10 having a hollow core portion 2 is prepared, and a liquid-state UV-curable resin 11 is poured into the hollow core portion 2 disposed at both ends of the optical fiber 10 (FIG. 5A). In this case, the proportion of the cross-sectional area of the UV-curable resin 11 to that of the hollow core portion 2 continuously decreases toward the opposite end face of the optical fiber 10 because of surface tension of the UV-curable resin 11.

Subsequently, both end faces of the optical fiber 10 are irradiated with ultraviolet rays, so that the liquid-state UV-curable resin 11 poured in the hollow core portion 2 is cured. Consequently, sealed portions 11 are formed at both ends of the optical fiber 10 (FIG. 5B). Since the hollow core portion 2 is thus closed by using the UV-cured resin, sealing of the hollow core can be simply and easily achieved.

Then, both end portions of the optical fiber 10 are inserted into holes of ferrules 6, and fixed to the ferrules 6 by adhesives. After that, the end faces of the optical fiber 10 protruding from end faces of the ferrules 6 are polished, and optical connectors are attached thereto (FIG. 5C).

Since foreign materials and the like are also prevented from entering the hollow core portion 2 in this embodiment, optical losses can be reduced, and the optical fiber 1 is prevented from breakage at the hollow core portion 2 when the end faces of the optical fiber 1 are polished.

While the hollow core portion 2 of the optical fiber 10 is closed by the UV-curable resin 11 in this embodiment, the material to be put into the hollow core portion 2 is not limited to the UV-curable resin 11, and, for example, thermally curable resin may be used.

A third embodiment of the present invention will now be described with reference to FIGS. 6 and 7A to 7C. In these figures, members which are the same as or equivalent to those in the first embodiment are denoted by the same reference numerals, and descriptions thereof are omitted.

Figure 6:
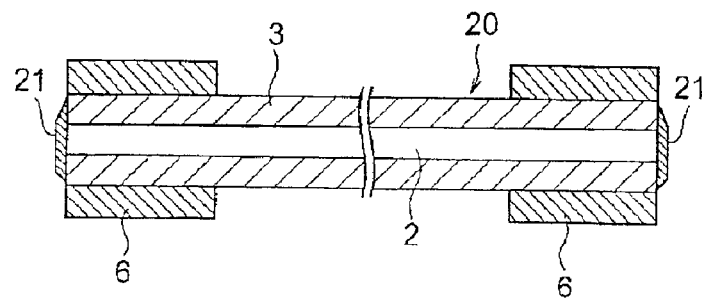
FIG. 6 is a longitudinal sectional view of an optical fiber having a sealed end structure according to a third embodiment of the present invention.

In FIG. 6, lids 21 made of thermally curable resin are mounted on both ends of an optical fiber 20 of this embodiment so as to form sealed portions for closing a hollow core portion 2. As the thermally curable resin, for example, epoxy resin, melamine resin, or phenol resin may be used.

Figure 7A:
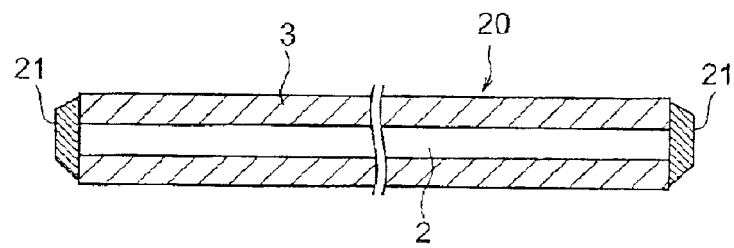
FIGS. 7A to 7C are explanatory views showing the process of producing the optical fiber shown in FIG. 6.
Figure 7B:
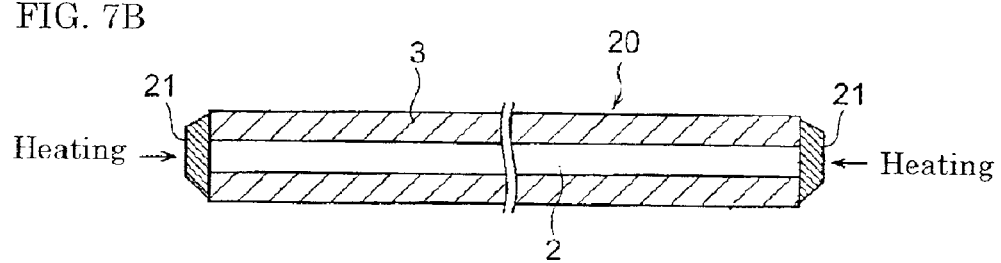
Figure 7C:
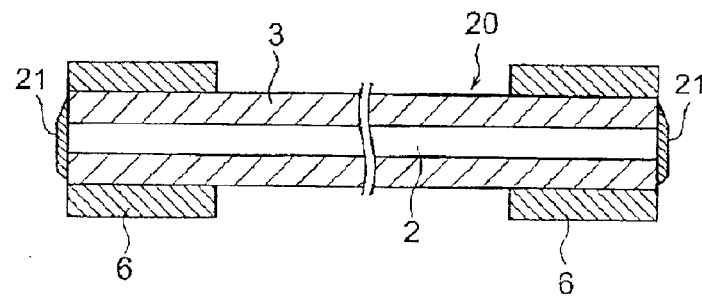

A process of producing the optical fiber 20 will now be described with reference to FIGS. 7A to 7C. First, an optical fiber 20 having a hollow core portion 2 is prepared, and thermally curable resin 22 is applied onto both end faces of the optical fiber 20 (FIG. 7A).

Next, both end faces of the optical fiber 20 are heated so as to set the resin. As a result, the optical fiber 20 in which the hollow core portion 2 is closed at both end faces is obtained (FIG. 7B). Since the hollow core portion 2 is thus closed by applying and setting the thermally curable resin 22, it can be simply and easily sealed at the end faces of the optical fiber 20. In this case, since the hollow core portion 2 is covered with the thermally curable resin 22, various functions, for example, antireflection, wavelength selection, and polarization selection can be obtained by using a functional resin as the thermally curable resin 22.

Next, both ends of the optical fiber 20 are inserted into holes of ferrules 6, and fixed to the ferrules 6 by adhesives. After that, end faces of the optical fiber 20 protruding from end faces of the ferrules 6 are polished, and optical connectors are attached thereto. Polishing amount of the end faces of the optical fiber 20 is determined within a range that the sealing of the hollow core portion 2 can be maintained, with sufficient thermally curable resin on both end faces of the optical fiber.

As described above, since foreign materials and the like are prevented from entering the hollow core portion 2 in this embodiment, increase of optical losses can be suppressed, and the optical fiber 20 can be prevented from breakage at the hollow core portion 2 when the end faces of the optical fiber 20 are polished.

Figure 8:
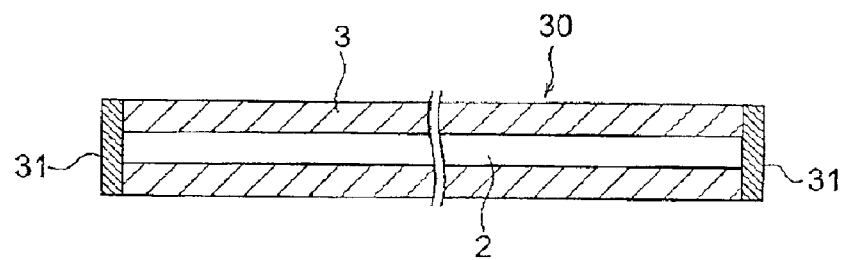
FIG. 8 is a longitudinal sectional view of an optical fiber having a sealed end structure according to a fourth embodiment of the present invention.

A fourth embodiment of the present invention will now be described with reference to FIG. 8. In this embodiment, the structure of lid is different from that in the third embodiment. In FIG. 8, members which are the same as or equivalent to those in the third embodiment are denoted by the same reference numerals, and descriptions thereof are omitted.

Referring to FIG. 8, lids 31 made of a thin metal film are mounted on both end faces of an optical fiber 30 of the embodiment so as to form sealed portions which close a hollow core portion 2. The lids 31 of thin metal film are bonded with both end faces of the optical fiber 30, for example, by evaporation. In this case, the condition of evaporation is determined so that the hollow core portion 2 can be reliably sealed by the evaporated thin films.

As the lids 31, not only thin metal films but also optical components may be bonded with the end faces of the optical fiber 30. In this case, when the thin films and the optical components are functional, various functions, such as antireflection, wavelength selection, and polarization selection, can be obtained.

A fifth embodiment of the present invention will now be described with reference to FIGS. 9 and 10. In the figures, members which are the same as or equivalent to those in the first embodiment are denoted by the same numerals, and descriptions thereof are omitted.

Figure 9:
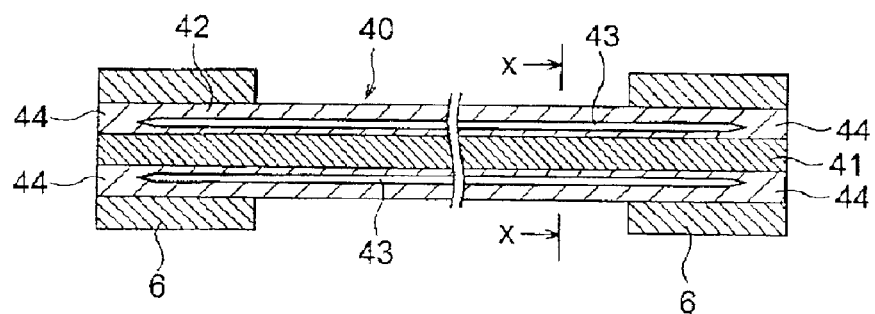
FIG. 9 is a longitudinal sectional view of an optical fiber having a sealed end structure according to a fifth embodiment of the present invention.

Referring to FIG. 9, an optical fiber 40 of the embodiment is composed of a core portion 41 made of silica glass, and a cladding portion 42 which is also made of silica glass surrounding the core portion 41. The core portion 41 is added with a dopant, such as germania ($GeO_2$), so that the refractive index of the core portion 41 is higher than that of the cladding portion 42.

Figure 10:
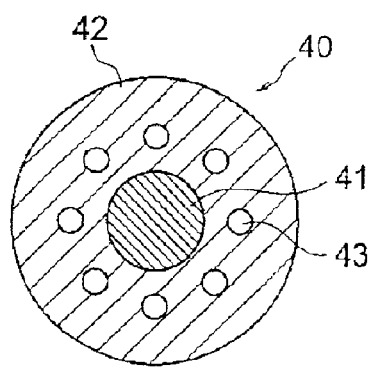
FIG. 10 is a view of cross section taken along line X—X in FIG. 9.

A plurality of hollow portions 43 are formed in the cladding portion 42 on the periphery of the core portion 41 so as to extend along the axis of the optical fiber 40, as shown in FIG. 10. Each of the hollow portions 43 is closed at both end faces of the optical fiber 40 so as to form sealed portions 44. The sealed portions 44 are formed by softening the cladding portion 42 with heat, as described in the first embodiment.

In such an optical fiber 40 in which the cladding portion 42 includes the hollow portions 43, foreign materials and the like are prevented from entering the hollow portions 43. Therefore, deterioration of optical characteristics, for example, increase of optical loss, can be prevented. It is also possible to prevent the optical fiber 40 from breakage at the hollow portions 43 when the end faces of the optical fiber 40 are subjected to polishing or the like in order to attach optical connectors thereto.

While the sealed portions 44 are formed by heating and softening the cladding portion 42 at the end faces of the optical fiber 40 in this embodiment, they may be formed by placing a curable resin into the hollow portions 43, as shown in the second embodiment, by forming lids made of resins on the end faces of the optical fiber 40, as shown in the third embodiment, or by forming lids made of a metal film on the end faces of the optical fiber 40, as shown in the fourth embodiment.

When the sealed portions 44 are formed by placing a liquid-state material (curable resin) into the hollow portions 43, it is preferable that the refractive index of the curable resin be equivalent to or lower than the refractive index of the material of the cladding portion 42. This can reduce the influence of sealing of the hollow portions 43 on the optical transmission characteristics.

While the present invention has been described with reference to what are presently considered to be the preferred embodiments, it is to be understood that the invention is not limited to the disclosed embodiments. For example, while the hollow portion (including the hollow core portion) is closed at both ends of the optical fiber in the above embodiments, it may be closed only at one end of the optical fiber, as necessary. Further, when an optical connector are attached to the ends portions of the optical fibers, a multi channel connector may be attached to a plurality of optical fibers.

What is claimed is:

1. An optical fiber comprising: a core portion; and a cladding portion which surrounds said core portion, wherein said cladding portion has a hollow portion extending along axis, and a sealed portion is formed at least at one end face of said optical fiber so as to close said hollow portion.

2. An optical fiber according to claim 1, wherein said sealed portion is formed of a lid which covers said hollow portion.

3. An optical fiber according to claim 2, wherein said lid is made of a resin or metal film.

4. An optical fiber comprising: a core portion; and a cladding portion which surrounds said core portion, wherein at least one of said core portion and said cladding portion has a hollow portion extending along axis, and a sealed portion is formed at least at one end face of said optical fiber so as to close said hollow portion, wherein said sealed portion is formed by heating said optical fiber and closing said hollow portion.

5. An optical fiber comprising: a core portion; and a cladding portion which surrounds said core portion, wherein at least one of said core portion and said cladding portion has a hollow portion extending along axis, and a sealed portion is formed at least at one end face of said optical fiber so as to close said hollow portion, wherein said sealed portion is formed by placing a liquid-state material into said hollow portion and solidifying the material.

6. An optical fiber comprising: a core portion; and a cladding portion which surrounds said core portion, wherein at least one of said core portion and said cladding portion has a hollow portion extending along axis, and a sealed portion is formed at least at one end face of said optical fiber so as to close said hollow portion, wherein said sealed portion comprises another optical fiber having no hollow portion in core or cladding.

7. An optical fiber according to any one of claims 1, 4, 5, and 6, wherein a connector is attached to said end face of said optical fiber.

8. An optical fiber according to any one of claims 1, 4, 5, and 6, wherein said sealed portion is formed at both ends of said optical fiber.

9. A production method of an optical fiber including a core portion, and a cladding portion which surrounds said core portion, wherein at least one of said core portion and said cladding portion has a hollow portion extending along its axis, and a sealed portion is formed at least at one end face of said optical fiber so as to close said hollow portion, and wherein said production method comprises the steps of: evacuating said hollow portion through one end of said optical fiber so as to reduce the pressure inside said hollow portion; and heating the other end of said optical fiber to close said hollow portion thereby.

10. A production method of an optical fiber according to claim 9, wherein said heating is performed with a fusion splicer.

11. A production method of an optical fiber including a core portion, and a cladding portion which surrounds said core portion, wherein at least one of said core portion and said cladding portion has a hollow portion extending along the axis, and a sealed portion is formed at an end face of said optical fiber so as to close said hollow portion, and wherein said production method comprises the steps of: heating a middle portion of said optical fiber so as to close said hollow portion at said middle portion; and cutting said optical fiber at said middle portion.

12. A production method of an optical fiber according to claim 11, wherein said heating is performed with a fusion splicer.

13. A production method of an optical fiber including a core portion, and a cladding portion which surrounds said core portion, wherein at least one of said core portion and said cladding portion has a hollow portion extending along its axis, and a sealed portion at least at one end face of said optical fiber so as to close said hollow portion, said method comprising:

heating said optical fiber with a fusion splicer to close said hollow portion.

14. A production method of an optical fiber including a core portion, and a cladding portion which surrounds said core portion, wherein at least one of said core portion and said cladding portion has a hollow portion extending along the axis, and a sealed portion is formed at an end face of said optical fiber so as to close said hollow portion, said method comprising:

connecting said optical fiber to an optical fiber having no hollow core or cladding portion, so as to close said hollow portion.

* * * * *